(12) United States Patent
Han et al.

(10) Patent No.: US 7,273,918 B2
(45) Date of Patent: **\*Sep. 25, 2007**

(54) THERMALLY STABLE SELF-DOPED FUNCTIONALIZED POLYANILINES

(75) Inventors: Chien-Chung Han, 1F, No. 7, Lane 52, Chin-Cheng I Rd., Lin 18, Chien-Kung Li, E. District, Hsinchu (TW); Chia-Hui Lu, Kaohsiung (TW)

(73) Assignee: Chien-Chung Han, Hsinchu (TW)

( \* ) Notice: Subject to any disclaimer, the term of this patent is extended or adjusted under 35 U.S.C. 154(b) by 419 days.

This patent is subject to a terminal disclaimer.

(21) Appl. No.: 10/949,570

(22) Filed: Sep. 23, 2004

(65) Prior Publication Data
US 2005/0035335 A1 Feb. 17, 2005

Related U.S. Application Data

(63) Continuation-in-part of application No. 10/012,590, filed on Dec. 5, 2001, now Pat. No. 7,034,100, which is a continuation of application No. 09/484,075, filed on Jan. 18, 2000, now Pat. No. 6,380,346.

(51) Int. Cl.
*C08G 65/38* (2006.01)
(52) U.S. Cl. ........................ 528/210; 528/212; 528/214; 528/422
(58) Field of Classification Search ................ 528/210, 528/212, 214, 422
See application file for complete search history.

(56) References Cited

U.S. PATENT DOCUMENTS 5,346,649 A \* 9/1994 Karna et al. ................. 252/500
5,489,400 A \* 2/1996 Liu et al. ..................... 252/500

\* cited by examiner

*Primary Examiner*—Bernard Lipman
(74) *Attorney, Agent, or Firm*—W. Wayne Liauh

(57) ABSTRACT

Just like other conducting polymers, polyanilines are useful for many important electric and electrooptical applications. A self-doped polyaniline that contains a stable/immobile, covalently bonded acid moiety on the backbone is highly desired, due to their greater resistances to solvent-washing, rain-flushing, and thermal evaporation.

The present invention discloses a new type of thermally stable self-doped functionalized polyanilines that are thermally much more stable than the previously reported sulfonated-polyaniline, which was believed to be the most thermally stable self-doped polyaniline known in the art. The present invention also discloses a new and effective method for making this new type of thermally stable self-doped functionalized polyanilines.

9 Claims, 3 Drawing Sheets

(II)

| R₇SH | R₇OH | R₈R₉NH | R₈R₉PH |
|---|---|---|---|
| (III) | (IV) | (V) | (VI) |

| R₇SM | R₇OM | R₈R₉NM | R₈R₉PM |
|---|---|---|---|
| (VII) | (VIII) | (IX) | (X) |

(XI)

(I)

(XII)

(XIII)

THERMALLY STABLE SELF-DOPED FUNCTIONALIZED POLYANILINES

This application is a continuation-in-part application of U.S. patent application Ser. No. 10/012,590, filed Dec. 5, 2001, now U.S. Pat. No. 7,034,100 which is a continuation application of U.S. patent application Ser. No. 09/484,075, filed Jan. 18, 2000, now U.S. Pat. No. 6,380,346 B1, the contents thereof are incorporated herein by references.

FIELD OF THE INVENTION

The present invention generally relates to polyanilines, and more particularly to thermally stable self-doped functionalized polyanilines.

DESCRIPTION OF THE RELATED ART

Polyaniline is a backbone conjugated conducting polymer and has various applications in the art. General applications of polyaniline and other conducting polymers are found in electronics, electrooptical devices, anti-corrosion, semiconductors, and microelectronics.

Owing to their unique electrooptical properties and market potential, polyanilines have been one of the recent focuses in the field of conducting polymer research. The insulating emeraldine base form of polyaniline can be conveniently doped with a simple protonic acid (e.g. HCl) to form a highly conductive emeraldine salt (1-5 S/cm) (Angelopoulos, M.; Asturias, G. E.; Ermer, S. P.; Ray, A.; Scherr, E. M.; MacDiarmid, A. G. *Mol. Cryst. Liq. Cryst.* 1988, 160, 151). However, the susceptibility of the labile acid dopant to evaporation and rain flushing loss is detrimental to long term thermal and environmental stabilities. Therefore, a self-doped polyaniline that contains a stable/immobile, covalently bonded acid moiety on the backbone is highly desired, due to their greater resistances to solvent-washing or rain-flushing and also due to its potentially higher thermal stability.

Self-doped polyanilines can be prepared via ring-sulfonation to have the acid functional group being covalently bonded directly to their rings, such as the sulfonated-polyanilines. For example, the sulfonated-polyaniline, prepared by the reaction of polyaniline emeraldine base with fuming sulfonic acid, was reported by Yue and Epstein to be as conductive as 0.1 S/cm (Yue, J.; Epstein, A. J. *J. Am. Chem. Soc.* 1990, 112, 2800). Self-doped polyanilines can also be prepared to have the acid functional group being covalently bonded indirectly through an alkyl linker to the nitrogen sites, such as poly (aniline-co-N-propanesulfonic acid aniline) (PAPSAH) and poly(aniline-co-N-propylbenzenesulfonic acid) (PAPBSAH). For example, PAPSAH, prepared by reacting the deprotonated polyaniline with 1,3-propanesultone, was reported by Chen et al. to have a room temperature conductivity of about $10^{-2}$-$10^{-4}$ S/cm (Chen, S. A.; Hwang, G. W. *J. Am. Chem. Soc.* 1995, 117, 10055). For another example, PAPBSAH, prepared by reacting the deprotonated polyaniline with p-(3-bromopropyl) benzenesulfonic acid sodium salt, was reported by Chen et. al. to have a room temperature conductivity of about $8.5 \times 10^{-5}$ S/cm (Hua, M. Y; Su, Y N.; Chen, S. A. *Polymer* 2000, 41, 813). All these self-doped polyanilines indeed showed much-improved solvent-resistance and water-resistance and have a higher thermal stability than the HCl-doped polyaniline.

Among these different types of self-doped polyanilines known in the art, the ring sulfonated-polyanilines were found to be particularly interested, because they have not only a greater conductivity but also a higher thermal stability than their nitrogen-site-substituted counterparts (e.g., PAPSAH and PAPBSAH). When subjected to a thermal treatment at the elevated temperatures, PAPSAH and PAPBSAH were found to start losing their sulfonic acid groups at relative low temperatures ranging from 110 to 125° C., while the sulfonated-polyanilines was found to initiate the same decomposition reaction at a much higher temperature of about 185° C.

Although the ring-sulfonated self-doped polyanilines have a relative higher thermal stability than the nitrogen-site-substituted self-doped polyanilines, their initial degradation temperature of 180-190° C. may not be sufficiently high enough for many important applications that involve a high temperature soldering process (greater than about 200° C.), such as the applications in semiconductor circuitry, electronic devices, and electrooptical devices. Furthermore, the conductivity of the sulfonated-polyanilines was also found to somehow decrease, although slowly with time, even at room temperatures, thus their ability in long-term applications could be significantly hindered, such as the application in solar cells that are constantly exposed to heavy sunlight and thus situate themselves in a constant hot environment. Therefore, there is still a need in the art to search for a self-doped polyaniline that has not only a higher thermal stability when subjected to a short term heating treatment, but also has long-term storage stability at room temperatures.

SUMMARY OF THE INVENTION

The present invention relates to the neutral and conductive forms of self-doped polyanilines. More particularly, the present invention relates to thermally stable self-doped functionalized polyanilines, which comprise of substituted- and unsubstituted-aniline recurring units of Formula (I) in FIG. 1:

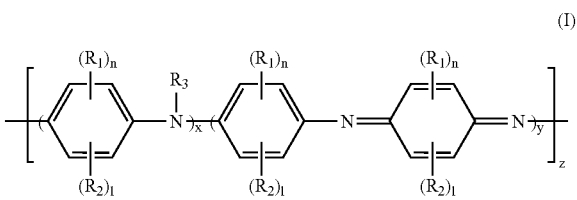

wherein:

x and y are the same or different at each occurrence and are integers equal to or greater than 0, with the proviso that the sum of x and y is greater than 0;

z is the same or different at each occurrence and is an integer greater than 0;

n is the same or different at each occurrence and is an integer from 0 to about 4;

l is the same or different at each occurrence and is an integer from 0 to 4, with the proviso that at least one occurring l is not zero and with the further proviso that the sum of n and l at the same occurring repeat unit is equal to or less than 4;

$R_1$ and $R_3$ are the same or different at each occurrence and are a hydrogen or a substituent; and $R_2$ is the same or different at each occurrence and has the formula of:

—X—$R_4$ wherein X is the same or different at each occurrence and is a divalent atom or moiety selected from the group consisting of S, O, PR$_5$, NR$_5$C(=O), and NR$_5$; and R$_4$ is the same or different at each occurrence and is an acid-substituted functional group wherein said functional group is selected from the group consisting of alkyl, aryl, alkenyl, alkynyl, alkenynyl, allyl, benzyl, cycloalkyl, cycloalkenyl, cycloalkynyl, cycloalkenynyl, alkanoyl, aryloyl, mercaptoalkyl, mercaptoaryl, mercaptoalkylarylalkyl, mercaptoarylalkylaryl, hydroxyalkyl, hydroxyaryl, alkylsilyl, arylsilyl, alkoxysilyl, aroxysilyl, amino acid, epoxy moieties, alkoxyalkyl, aryloxyalkyl, alkoxycarbonyl, alkoxysilylalkyl, alkylsilylalkyl, alkoxysilylaryl, alkylsilylaryl, heteroaryl, alkylaryl, alkylheteroaryl, arylalkyl, heteroarylalkyl, alkylarylalkyl, alkylheteroarylalkyl, alicyclic, and heterocyclic groups; wherein said acid substituent is selected from the group consisting of phosphonic acid, phosphinic acid, boric acid, carboxylic acid, sulfinic acid, sulfonic acid, sulfamic acid, amino acid, and the derivatives thereof such as esters and salts and the like. In addition to the acid substituents, R$_4$ may optionally contain one or more other types of substituents selected from the group consisting of deuterium, and other permissible R$_1$ group.

The present invention is also related to a new and effective method for making said self-doped functionalized polyanilines. More particularly, an embodiment of the method of the present invention comprises the steps of:
(a) providing polyaniline in a solid state form; and
(b) subjecting the solid state polyaniline to a reaction treatment with a solution of reactive chemical reagent(s) in a selected solvent or solvent mixture for a period of time, the solvent or solvent mixture is capable of dissolving or dispersing the chemical reagent(s) and swelling or wetting the solid state polyaniline, and the chemical reagent(s) is capable of functionalizing the solid state polyaniline and transforming the backbone of the solid state polyaniline into a more reduced form.

Another embodiment of the method of this invention comprises the steps of:
(a) providing polyaniline in a solid state form;
(b) subjecting the solid state polyaniline to a redox treatment to convert the backbone of the solid state polyaniline into a desirable oxidation state;
(c) subjecting the resultant polyaniline to a reaction treatment with a solution of reactive chemical reagent(s) in a selected solvent or solvent mixture for a period of time, where the solvent or solvent mixture is capable of dissolving or dispersing the chemical reagent(s), and swelling or wetting the solid state polyaniline, where the chemical reagent(s) is capable of functionalizing the solid state polyaniline and transforming the backbone of the solid state polyaniline into a more reduced form; and
(d) repeating steps (b) and/or (c);
wherein steps (b) and (c) can be reversed, or step (b) or step (c) can be omitted as desired in the first cycle or any subsequent repeat cycles of the redox/reaction treatments.

BRIEF DESCRIPTION OF THE DRAWINGS

Other features and advantages of the present invention will be apparent from the following detailed description when read in conjunction with the accompanying drawings, in which like reference designations represent like features throughout the enumerated Figures. The drawings are not drawn to scale, unless specifically noted as such, the emphasis being placed on illustrating the principles of the present invention. In the accompanying drawings.

DETAILED DESCRIPTION OF THE INVENTION

Figure 3:
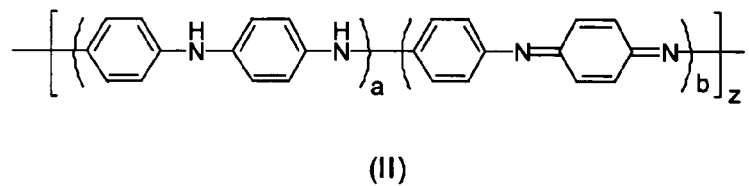
FIG. 3 is a diagram illustrating the general formula structure for a unsubstituted polyaniline in Formula (II), the useful reactive chemical reagents in Formula (III)-(X), and the useful aniline monomers in Formula (XI) for making the polyanilines suitable for implementing a preferred embodiment of the present invention.
Figure 3:
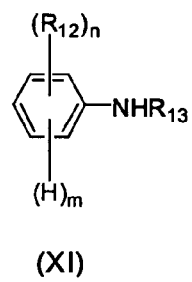

Reference is now made in detail to an embodiment of the invention that illustrates the best mode presently contemplated by the inventor(s) for practicing the invention. Other embodiments are also described herein.

The present invention relates to the neutral and conductive forms of self-doped polyanilines. More particularly, the present invention relates to thermally stable self-doped functionalized polyanilines, which comprise of substituted- and unsubstituted-aniline recurring units of Formula (I) in FIG. 1:

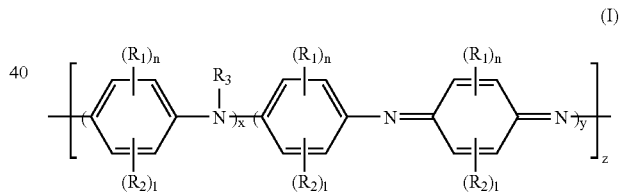

(I)

wherein:

x and y are the same or different at each occurrence and are integers equal to or greater than 0, with the proviso that the sum of x and y is greater than 0;

z is the same or different at each occurrence and is an integer greater than 0;

n is the same or different at each occurrence and is an integer from 0 to about 4;

l is the same or different at each occurrence and is an integer from 0 to 4, with the proviso that at least one occurring l is not zero and with the further proviso that the sum of n and l at the same occurring repeat unit is equal to or less than 4;

R$_1$ and R$_3$ are the same or different at each occurrence and are selected from the group consisting of hydrogen, deuterium, alkyl, alkenyl, alkynyl, alkenynyl, aryl, alkylaryl, arylalkyl, allyl, benzyl, alkoxy, aryloxy, cycloalkyl, cycloalkenyl, cycloalkynyl, cycloalkenynyl, alkanoyl, aryloyl, aryloyloxy, alkanoyloxy, alkylthio, arylthio, alkylthioalkyl, alkylthioaryl, arylthioaryl, mercaptoalkoxy, mercaptoaryloxy, mercaptoalkyl, mercaptoaryl, mercaptoarylthio, mercaptoalkylthio, mercaptoalkylarylalkyl, mercaptoarylalkylaryl, halo, hydroxyl, hydroxyalkyl, hydroxyaryl, cyano, nitro, alkylsilyl, arylsilyl, alkoxysilyl, aroxysilyl, amino acid, epoxy moieties, amino, aminoalkyl, aminoaryl, amido, amidoalkyl, amidoaryl, arylamino, diarylamino, alkylamino, dialkylamino, alkylarylamino, alkoxyalkyl, aryloxyalkyl, alkoxycarbonyl, alkoxysilylalkyl, alkylsilylalkyl, alkoxysilylaryl, alkylsilylaryl, heterocyclic ring, aliphatic ring, aromatic ring, heteroaromatic ring, alkylsulfinyl, arylsulfinyl, alkylsulfonyl, arylsulfonyl, alkylsulfinylalkyl, alkylsulfonylalkyl, alkylcarboxylate, alkylsulfinate, alkylsulfonate, alkylphosphonate, and the ester derivatives of acid functional groups; wherein said acid functional groups are selected from the group consisting of phosphonic acid, phosphinic acid, boric acid, carboxylic acid, sulfinic acid, sulfonic acid, sulfamic acid, and amino acid; said aromatic ring, said heteroaromatic ring, said aliphatic ring, and said heterocyclic ring can be unsubstituted or substituted with one or more functional groups selected from the group consisting of phosphonic acid, phosphinic acid, boric acid, carboxylic acid, sulfinic acid, sulfonic acid, sulfamic acid, amino acid, derivatives of the aforementioned acids such as their esters and salts, alicyclic ring, heteroalicyclic ring, aromatic ring, heteroaromatic ring, halo, nitro, cyano, mercapto, hydroxyl, epoxy moieties, and other aforementioned $R_1$ and $R_3$ groups; any two $R_1$ groups together, or any $R_1$ and $R_3$ groups together forming a substituted or unsubstituted alkylene, alkenylene, or alkynylene chain completing a 3, 4, 5, 6, 7, 8, 9 or 10 membered aromatic, heteroaromatic, heteroalicyclic, or alicyclic ring, which ring may include one or more heteroatoms and/or divalent moieties such as nitrogen, sulfur, sulfinyl, sulfonyl, phosphorus, selenium, ester, carbonyl, and oxygen, wherein permissible substituents are the aforementioned acid and other functional groups; or $R_1$ is an aliphatic moiety having repeat units of the formula:

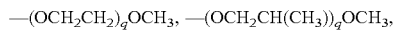

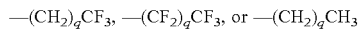

wherein q is a positive whole number; or $R_1$ is derivatives of a moiety of the formula:

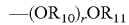

wherein:

$R_{10}$ is a divalent alkylene moiety having from 1 to about 7 carbon atoms;

$R_{11}$ is alkyl having from 1 to about 20 carbon atoms;

r is a natural number from 1 to about 50;

$R_2$ is the same or different at each occurrence and has the formula:

wherein X is the same or different at each occurrence and is a divalent atom and moiety selected from the group consisting of S, O, $PR_5$, $NR_5C(=O)$, and $NR_5$, wherein: $R_5$ is the same or different at each occurrence and is selected from the group consisting of hydrogen and other permissible $R_1$ group; and $R_4$ is the same or different at each occurrence and is an acid-substituted functional group, wherein said functional group is selected from the group consisting of alkyl, aryl, alkenyl, alkynyl, alkenynyl, allyl, benzyl, cycloalkyl, cycloalkenyl, cycloalkynyl, cycloalkenynyl, alkanoyl, aryloyl, mercaptoalkyl, mercaptoaryl, mercaptoalkylarylalkyl, mercaptoarylalkylaryl, hydroxyalkyl, hydroxyaryl, alkylsilyl, arylsilyl, alkoxysilyl, aroxysilyl, amino acid, epoxy moieties, alkoxyalkyl, aryloxyalkyl, alkoxycarbonyl, alkoxysilylalkyl, alkylsilylalkyl, alkoxysilylaryl, alkylsilylaryl, heteroaryl, alkylaryl, alkylheteroaryl, arylalkyl, heteroarylalkyl, alkylarylalkyl, alkylheteroarylalkyl, alicyclic, and heterocyclic groups; and said acid substituent is selected from the group consisting of phosphonic acid, phosphinic acid, boric acid, carboxylic acid, sulfinic acid, sulfonic acid, sulfamic acid, amino acid, and the derivatives thereof such as esters and salts and the like. In addition to the acid substituents, $R_4$ may optionally contain one or more other types of substituents selected from the group consisting of deuterium, and other permissible $R_1$ group.

Figure 1:
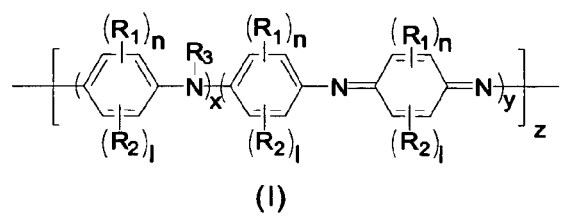
FIG. 1 is a diagram illustrating the thermally stable self-doped functionalized polyanilines of the present invention.

A preferred embodiment of the present invention, the thermally stable self-doped functionalized polyanilines of the present invention have a structure comprising of the repeat units of Formula (I) in FIG. 1, wherein:

x, y, z, n, l, $R_1$, $R_3$, $R_4$, and $R_5$ are as described above, and

X is the same or different at each occurrence and is selected from the group consisting of S, $PR_5$, $NR_5C(=O)$, and $NR_5$.

A particular preferred embodiment of the present invention, the thermally stable self-doped functionalized polyanilines of the present invention have a structure comprising of the repeat units of Formula (1) in FIG. 1, wherein:

x, y, z, n, l, $R_1$, $R_3$, $R_4$, and $R_5$ are as described above; and

X is the same or different at each occurrence and is selected from the group consisting of S and $NR_5C(=O)$.

The most preferred embodiment of the present invention, the thermally stable self-doped functionalized polyanilines of the present invention have a structure comprising of the repeat units of Formula (1) in FIG. 1, wherein:

x, y, z, n, l, $R_1$, $R_3$, and $R_4$ are as described above; and X is S.

The present invention also relates to a new and effective method for making said self-doped functionalized polyanilines. More particularly, an embodiment of the method of the present invention comprises the steps of:

(a) providing polyaniline in a solid state form; and (b) subjecting the resultant polyaniline to a reaction treatment with a solution of reactive chemical reagent(s) in a selected solvent or solvent mixture for a period of time, the solvent or solvent mixture is capable of dissolving or dispersing the chemical reagent(s) and swelling or wetting the solid state polyaniline, and the chemical reagent(s) is capable of functionalizing the solid state polyaniline and transforming the backbone of the solid state polyaniline into a more reduced form.

Figure 2:
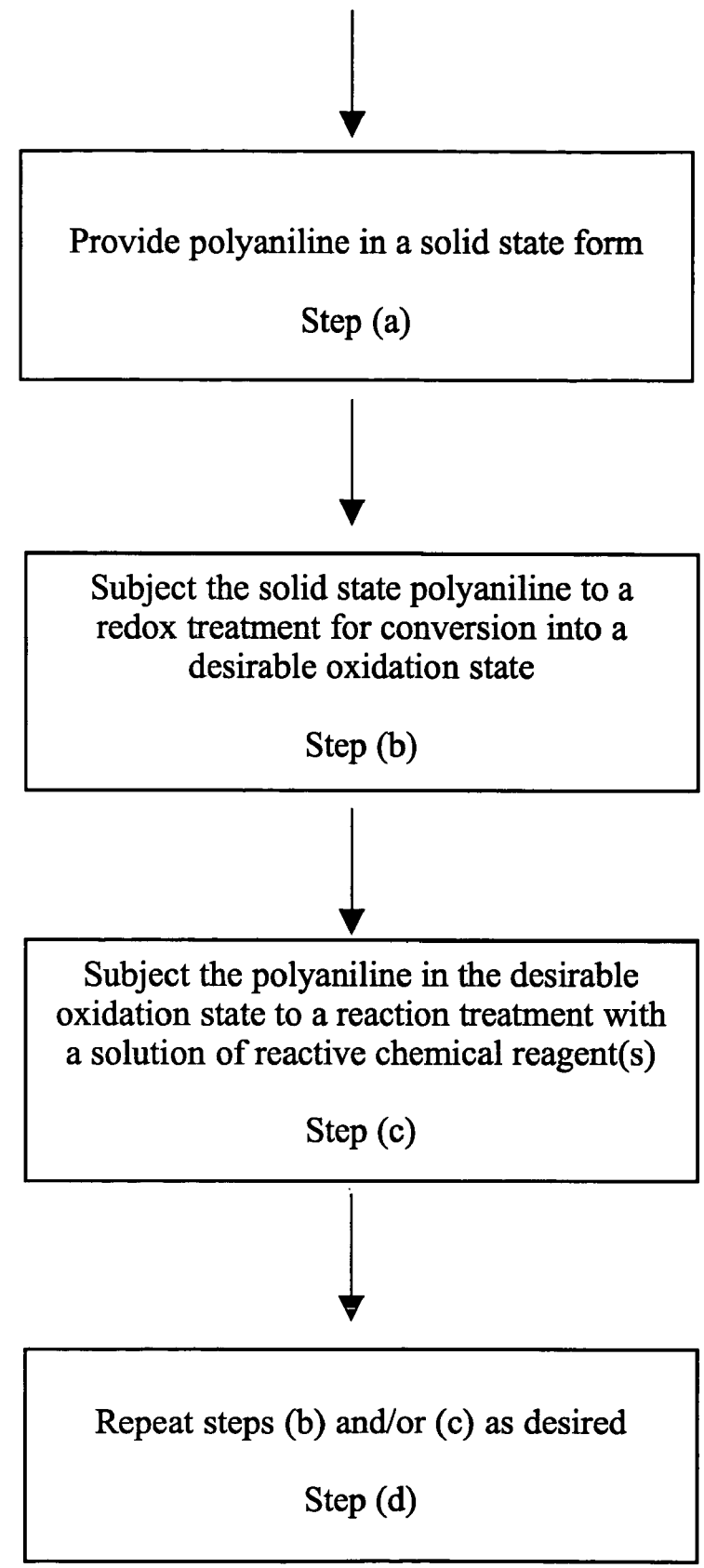
FIG. 2 is a flow diagram illustrating a preferred method for making the thermally stable self-doped functionalized polyanilines of the present invention.

Referring to FIG. 2, another embodiment of the method of the present invention comprises the steps of:

(a) providing polyaniline in a solid state form;

(b) subjecting the solid state polyaniline to a redox treatment to convert the backbone of the solid state polyaniline into a desirable oxidation state;

(c) subjecting the resultant polyaniline to a reaction treatment with a solution of reactive chemical reagent(s) in a selected solvent or solvent mixture for a period of time, where the solvent or solvent mixture is capable of dissolving or dispersing the chemical reagent(s), and swelling or wetting the solid state polyaniline, where the chemical reagent(s) is capable of functionalizing the solid state polyaniline and transforming the backbone of the solid state polyaniline into a more reduced form; and (d) repeating steps (b) and/or (c);

wherein steps (b) and (c) can be reversed, or step (b) or step (c) can be omitted as desired in the first cycle or any subsequent repeat cycles of the redox/reaction treatments.

The reaction treatment is performed for a time period sufficient to convert the resultant polyaniline to a desired oxidation state different from that of the original solid state polyaniline.

In a preferred embodiment of the method according to the present invention, the polyaniline provided in step (a) is in a solid state form, such as powder, coating, films, pressed powder, multi-layer coating, laminated film, or any other solid state forms known in the art, and any combination thereof. A preferred solid state polyaniline is a polyaniline film or coating, which can be prepared from a solution of polyaniline using solution casting, dipping coating, spray coating, spin coating, brush coating, or any other methods known in the art. The polyaniline film or coating can also be prepared from a solid state form of polyaniline or its mixture with any conventional polymers, binders, or dopants using melt casting, hot-pressing, thermal evaporation coating, or any other methods known in the art. The polyaniline film or coating can also be prepared from its corresponding aniline monomer using reaction coating, any suitable electrochemical polymerization method, or other methods known in the art.

In step (b), the reactive chemical reagent(s) can be any agents that can functionalize (or derivatize) the polyaniline of step (a) and transform the backbone of the solid state polyaniline into a more reduced form. In this reaction treatment step, one or more types of reactive chemical reagents can be used either concurrently or sequentially, depending on the specific application. Preferred reactive chemical reagents are thiols, alcohols, phosphines, amines, and amides, or the combinations thereof. Any combination of the reactive chemical reagents can be used, providing that some of the chemical reagent(s) either in a single given reaction treatment step or among a series of different reaction treatment sequences can be eventually resulted in a $R_2$ substituent of the above-illustrated self-doped functionalized polyanilines of Formula (I) in FIG. 1.

The reactive chemical reagents can be used in either a neat state or a solution state. If a solution of such reactive chemical reagent(s) is employed, any concentration can be used as long as the reaction rate is acceptable at a given temperature. Any solvent or solvent mixture can be used in implementing the method of the present invention as long as it can dissolve or disperse the reactive chemical reagent(s), and swell or wet the solid state polyaniline, such as $H_2O$, methanol, ethanol, THF (tetrahydrofuran), mixtures of $H_2O$ and NMP (N-methylpyrrolidinone), mixtures of $H_2O$ and THF, and the like.

When the polarity of the polyaniline is very different from that of the chemical reagent, a co-solvent (or solvent mixture) can be used in implementing the method of the present invention. In this case, a co-solvent mixture containing at least one component that can dissolve or disperse the chemical reagent and another component that can swell or wet the surface of the solid state polyaniline can be used.

The solvent or solvent mixture selected for use in implementing the method of the present invention depends primarily on the polarity of the polyanilines and the chemical reagents employed. In general, more polar polyanilines and chemical reagents require solvents with higher dielectric constants and dipole moments. Conversely, less polar polyanilines and chemical reagents require solvents with lower dielectric constants and dipole moments.

In general, solvents or solvent mixtures chosen for use with polyanilines and chemical reagents of relatively polar have a dipole moment of approximately 0.3 to about 5.0, and a dielectric constant of about 10 to about 190. In a preferred embodiment according to the present invention, the dipole moment and the dielectric constant are approximately 1.8 to 5.0, and about 20 to about 100, respectively. Illustrative of the solvents are alcohols, linear and cyclic ethers, halocarbons, amides, substituted aromatics, nitrites, carbonates, sulfoxides and other sulfur containing solvents, nitro substituted alkanes and aromatics, water or mixtures thereof. Exemplary alcohols include methanol, ethanol, isopropanol, and the like. Illustrative linear and cyclic ethers include tetrahydrofuran, tetrahydropyran, 2-methyltetrahydrofuran, diethyl ether, diglyme, glyme and the like. Exemplary halocarbons include chloroform, 1,2-dichloroethane, dichloromethane and the like. Illustrative amides include dimethylformamide, N,N-dimethylacetamide, N-methylpyrrolidinone and the like. Illustrative substituted aromatics include xylene, anisole, toluene and the like. Exemplary nitriles include acetonitrile, propionitrile, benzonitrile, butyronitrile, and the like. Illustrative sulfoxides and other sulfur containing solvents include dimethylsulfoxide and the like. Illustrative nitro substituted alkanes and aromatics include nitromethane, nitropropane, nitrobenzene and the like. Exemplary carbonates include propylene carbonate, ethylene carbonate and the like.

In general, solvents or solvent mixtures chosen for use with the polyanilines and relatively non-polar chemical reagents have a dipole moment of 0 to about 3.0, preferably 0 to about 2.5, and a dielectric constant of approximately 2.0 to about 50, preferably about 2.0 to about 35. Illustrative of such solvents are halocarbons such as dichloromethane and the like, aromatic solvents such as toluene, xylene, benzene and the like, cyclic and linear ethers such as dimethoxyethane, tetrahydrofuran and the like, esters such as ethylacetate, methyl formate and the like, sulfoxides such as dimethylsulfoxide and the like, cyclic and linear amides such as dimethylformamide, N-methylpyrrolidinone, N,N-dimethylacetamide and the like, and ketones such as acetone and the like, and mixtures thereof.

In general, the amount of solvent or solvent mixture employed for the reaction media is not critical, so long as the chemical reagents can be dissolved or dispersed, and the solid state polyanilines can be swelled or wetted. A neat chemical reagent can also be used as long as it is in a liquid state under the reaction temperatures or conditions, and that it can swell or wet the solid state polyanilines.

The chemical reactions can be performed under any temperature so long as the reaction rate is acceptable, or that the polyanilines or the chemical reagents are not significantly destroyed at such temperature. The chemical reactions can be performed in any atmosphere as long as it will not significantly destroy the chemical reagents or polyanilines, such as $N_2$, Ar, He, Ne, air, $O_2$, and the like. If a precise control on the substitution degree and substitution pattern is needed, then an inert atmosphere is preferred, such as $N_2$, Ar, He, Ne. A catalytic amount of protonic acid or Lewis acid can be optionally added to the reaction mixture to increase the reaction rate. The reaction time can vary widely, depending on the reaction rate between the chemical reagents and the polyanilines under the employed reaction conditions, and also depending on the desired degree of derivatization.

An important feature of the chemical reactions is that as the reactive chemical reagent reacts with the polyanilines, it becomes attaching to the polyaniline backbone. The attached polyaniline backbone concurrently transforms into a more reduced state.

The backbone of a polyaniline comprises diiminoquinoid and diaminobenzenoid rings. A typical unsubstituted polyaniline has a backbone structure as represented by Formula (II) in FIG. 3, where a and b are real numbers, a+b=1, 0≦a≦1, and 0≦b≦1. In general, the lower the ratio of a/b is, the higher the oxidation degree of the polyaniline backbone. Conversely, the higher the ratio of a/b is, the higher the reduction degree of the polyaniline backbone. A more reduced polyaniline backbone is indicated by the relative increase of the ratio of a/b. The increase in the reduction degree can be generally observed by an infrared (IR) spectroscopy, as indicated by the increase in the intensity of the vibration peak at ca. 1500 cm$^{-1}$ (for the C=C stretching vibration of the diaminobenzenoid ring) relative to that at ca. 1600 cm$^{-1}$ (for the C=C stretching vibration of the diiminoquinoid ring) for an undoped polyaniline specimen.

In another embodiment of the method according to the present invention, an optional redox treatment step can be applied before or after the reaction treatment step with chemical reagent(s). The redox treatment can be used to adjust the redox degree of the polyaniline to a desirable level that is suitable for the subsequent reaction treatment or application. The redox treatment can be performed by chemical or electrochemical means. The chemical means is conducted by treating the resultant solid state polyaniline with oxidizing or reducing gas, such as $O_2$, air, $H_2$, other oxidizing gas, or with oxidizing or reducing chemicals, such as APS (ammonium peroxysulfate), MCPBA (m-chloroperoxybenzoic acid), $FeCl_3$, chromic acid, $K_2Cr_2O_7$, $Na_2Cr_2O_7$, $H_2O_2$, or any other oxidants known in the art, $H_2NNH_2$, phenylhydrazine, $LiAlH_4$, $NaBH_4$, or any other reductants known in the art, for a time sufficiently long enough to obtain a desirable redox state. The redox treatment can be performed in any temperature as long as the reaction rate is acceptable or the polyaniline is not significantly destroyed at such temperature.

The redox treatment step can also be carried out via an electrochemical means. The electrochemical means is conducted firstly by placing, attaching or coating the solid state polyaniline on or to a conductive substrate or surface, then connecting such conductive substrate or surface to a typical electrochemical cell or device, followed by subjecting the polyaniline to a desirable electrochemical potential to convert such polyaniline into a desirable redox state.

The preferred conductive substrates or surfaces are metals (such as platinum, stainless steel, iron, gold, silver, copper, and the like), metal alloys, ITO (indium tin oxide) glasses, p-type or n-type doped silicon, conductive metal oxides, or any other conductive surfaces or substrates known in the art.

The electrochemical voltage applied in each process can vary widely from about −0.2 V (vs. SCE or saturated calomel electrode) to about 0.9 V (vs. SCE) depending on the types of polyanilines employed and the desired substitution degree. In general, the higher the voltage is applied, the higher the oxidation degree of the polyaniline. The higher the oxidation degree of the polyaniline employed for the reaction with the chemical reagents, the higher the substation degree of the resultant polyaniline.

Such redox process can also be omitted for the applications where the desirable substitution degree is less than 25 mol % (basing on the polyaniline repeat unit) and the exact control on the substitution degree is not critical. In this case, a polyaniline as in its most stable emeraldine oxidation state (containing about 25 mol % of diiminoquinoid ring) can be used to directly perform the reaction treatment step with the chemical reagents without the need of a redox pre-treatment step. The redox treatment step is, however, particularly needed especially for the applications where the desirable substitution degree is more than 25 mol % (basing on the polyaniline repeat unit), and/or the exact control on the substitution degree is needed.

Nevertheless, in either of the above cases, a redox post-treatment step can be optionally added after the reaction treatment step to convert the resultant polyaniline to a desirable oxidation state to achieve optimal performance for the desired applications. For example, the resultant polyaniline can be electrically forced to 0.2-0.3 V (vs. SCE or saturated calomel electrode) after the reaction treatment step with the chemical reagents in order to quickly achieve its most conductive states. This capability is particularly important for the applications on semiconductor device applications, wherein a subsequent fabrication process immediately follows.

There are also some applications, such as anti-corrosion coatings, wherein the resulting polyaniline articles (as in the forms of surface layers, or films, or coatings) are exposed to an air atmosphere and a quick transformation to the most conductive states (i.e., the emeraldine oxidation state) is also not needed. In these cases, the resulting polyaniline articles can be slowly oxidized by the surrounding air atmosphere to gradually reach the most conductive and stable emeraldine oxidation state. There are also some applications, wherein a particular oxidation state of polyaniline other than the emeraldine oxidation state is needed. Then, in these cases, a post-redox treatment is a needed treatment step.

Such redox treatment and reaction treatment steps can also be applied in any desirable combination sequence and number of repeating treatment cycles. The chemical reagent(s) used in every repeating treatment cycle can be the same as or different from that used in any of the previous reaction treatment step(s). If the chemical reagent(s) used in the repeating treatment cycle is the same as that in the previous reaction treatment cycle, then the amount of the substituent derived from the chemical reagents is increased. In this case, the method according to the present invention can be used to prepare polyanilines having a specified degree of substitution to perform a desired property for particular applications. For example, the resultant polyaniline can be rendered with THF (tetrahydrofuran) solubility by subjecting an unsubstituted polyaniline film on a Pt (platinum) electrode with three treatment cycles, which contained in each cycle a redox treatment step of electrical enforcement of the polyaniline film at 0.5 V (vs. SCE or saturated calomel electrode) in a 0.5 M aqueous solution of $H_2SO_4$ and a reaction treatment step of soaking the polyaniline film in a 0.2 M methanolic solution of dodecane-1-thiol for 60 minutes. After the above treatments, the resultant polyaniline contains approximately 45-50 mol % of dodecylthio substituent basing on the polyaniline repeat units and becomes readily soluble in THF, which is actually a non-solvent for the parent unsubstituted polyaniline.

If the chemical reagent(s) used in the repeating treatment cycle is different from the previous reaction treatment cycle, then the variety of types of substituents on the same polyaniline backbone is increased. For example, an unsubstituted polyaniline film on a Pt electrode is subjected to three similar reaction treatment cycles as described in the above except that the thiols employed in each cycle were different, and were mercaptoacetic acid, dodecane-1-thiol, and mercaptoethanesulfonic acid, respectively. The resultant polyaniline contains three different functional groups on the same polyaniline backbone, and had been therefore rendered with multiple capabilities, such as self-doping ability and improved solubility.

The resultant self-doped polyanilines of this invention was found to have a surprisingly much higher thermal stability than that of the previously reported self-doped polyanilines. For example, when an unsubstituted polyaniline powder is react with a thiol that contain an acid functional group, such as mercaptopropanesulfonic acid, the resultant polyaniline was found to be reduced and simultaneously substituted with a propylthiosulfonated group, i.e. having a sulfonic acid group attached to the end of a propylthio substituent. The conductivity of the resultant propylthiosulfonated polyaniline (MPS-Pans) was found to be indeed rather insensitive to the pH change of an aqueous wash solution, showing a typical property behavior of a self-doped polyaniline. The thermal stabilities of this new type of self-doping MPS-Pans were examined by thermogravimetric analysis (TG). The TG result for a 20 mol % substituted MPS-Pan showed, in addition to the small water-losing event at below ca. 120° C., a minor weight loss event (due to the loss of the sulfonic acid group as confirmed by the XPS study) between 260 and 400° C. followed by a major weight loss event at 524° C. (due to the decomposition of the polymer backbone). The minor weight loss event has an initialization temperature at ca. 260° C. and an onset temperature of ca. 270° C. The major weight loss event has an onset temperature at ca. 470° C. with the initialization temperature being obscured by the proceeding minor event. For comparison, a 55.8 mol % sulfonated-polyaniline (S-Pan), prepared according to the previously reported method (Yue, J.; Wang, Z. H.; Cromack, K. R.; Epstein, A. J.; MacDiarmid, A. G. *J. Am. Chem. Soc.* 1991, 113, 2665) was also examined under the same TG conditions. The result indicated that, in addition to the initial water loss event at below ca. 120° C., the weight loss of the S-Pan showed a continuous multistage feature, with an initialization temperature at ca. 185° C. (due to the loss of the sulfonic acid group), an onset at ca. 230° C., and a first major decomposition at ca. 273° C. Similar initialization and major decomposition temperature at 190 and 275° C., respectively, for a 50 mol % S-Pan has been previously reported by Chen (Chen, S. A.; Hwang, G W. Macromolecules 1996, 29, 3950). These results clearly indicated that the new type of self-doped polyaniline MPS-Pan of this invention indeed showed a much higher thermal stability than that of the best example of self-doped polyaniline, i.e. the sulfonated-polyaniline S-Pan, previously known in the art. A plausible mechanism accounting for the fact that MPS-Pan has a much higher thermal stability than that of the sulfonated-polyaniline is proposed herewith. For the decomposition of S-Pan, a thermally activated, reversible 1,3-hydrogen shift may first occur between the protonated imine site and the sulfonated ortho-carbon site, following by a subsequent irreversible desulfonation due to the evaporation of the $SO_3$ byproduct at elevated temperatures. Whilst for MPS-Pan, although a similar 1,3-hydrogen shift may still happen between the protonated imine site and the MPS-substituted ortho-carbon site, the ortho-proton is readily removed by the terminal $-SO_3^-$ group to convert the unstable non-aromatic intermediate to the stable aromatic benzenoid ring, thus neutralizing the decomposition. Since the ring-sulfonation and -desulfonation was a reversible equilibrium reaction, the same hypothesis also seems to explain why the sulfonated-polyanilines can still lose, though at a slower pace, its sulfonic acid while they were stored at room temperatures. Such desulfonation mechanism can account for the long-term instability associated with the sulfonated-polyanilines.

Illustrative Examples of the Reactive Chemical Reagents

The reactive chemical reagents used in the present invention can be any agents as long as they can derivatize the polyaniline and concurrently result in a more reduced polyaniline backbone. Examples of the preferred reactive chemical reagents are thiols, alcohols, phosphines, amines, and amides, and the combinations thereof.

Illustrative of preferred reactive chemical reagents are the Formulas III to X in FIG. 3, wherein:

$R_7$, or $R_8$ and $R_9$ are the same or different at each occurrence and are selected from the group consisting of hydrogen, deuterium, alkyl, alkenyl, alkynyl, alkenynyl, aryl, alkylaryl, arylalkyl, allyl, benzyl, alkoxy, aryloxy, cycloalkyl, cycloalkenyl, cycloalkynyl, cycloalkenynyl, alkanoyl, aryloyl, aryloyloxy, alkanoyloxy, alkylthio, arylthio, alkylthioalkyl, alkylthioaryl, arylthioaryl, mercaptoalkoxy, mercaptoaryloxy, mercaptoalkyl, mercaptoaryl, mercaptoarylthio, mercaptoalkylthio, mercaptoalkylarylalkyl, mercaptoarylalkylaryl, hydroxyl, hydroxyalkyl, hydroxyaryl, alkylsilyl, arylsilyl, alkoxysilyl, aroxysilyl, amino acid, epoxy moieties, amino, aminoalkyl, aminoaryl, amido, amidoalkyl, amidoaryl, arylamino, diarylamino, alkylamino, dialkylamino, alkylarylamino, alkoxyalkyl, aryloxyalkyl, alkoxycarbonyl, alkoxysilylalkyl, alkylsilylalkyl, alkoxysilylaryl, alkylsilylaryl, heterocyclic ring, aliphatic ring, aromatic ring, heteroaromatic ring, alkylsulfinyl, arylsulfinyl, alkylsulfonyl, arylsulfonyl, alkylsulfinylalkyl, alkylsulfonylalkyl, alkylcarboxylate, alkylsulfinate, alkylsulfonate, alkylphosphonate; said aromatic ring, said heteroaromatic ring, said aliphatic ring, and said heterocyclic ring can be unsubstituted or substituted with one or more functional groups selected from the group consisting of phosphonic acid, phosphinic acid, boric acid, carboxylic acid, sulfinic acid, sulfonic acid, sulfamic acid, amino acid, derivatives of the aforementioned acids such as their esters and salts, alicyclic ring, heteroalicyclic ring, aromatic ring, heteroaromatic ring, halo, nitro, cyano, mercapto, hydroxyl, epoxy moieties, and other aforementioned $R_7$, $R_8$, and $R_9$ functional groups; or $R_7$, $R_8$, and $R_9$ groups are an aliphatic moiety having repeat units of the formula:

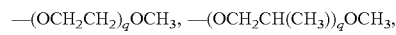

$-(OCH_2CH_2)_qOCH_3$, $-(OCH_2CH(CH_3))_qOCH_3$,

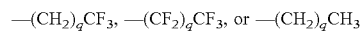

$-(CH_2)_qCF_3$, $-(CF_2)_qCF_3$, or $-(CH_2)_qCH_3$ wherein q is a positive whole number; or $R_7$, $R_8$, and $R_9$ are derivatives of a moiety of the formula:

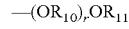

$-(OR_{10})_rOR_{11}$ wherein:

$R_{10}$ is a divalent alkylene moiety having from 1 to about 7 carbon atoms;

$R_{11}$ is alkyl having from 1 to about 20 carbon atoms;

r is a natural number from 1 to about 50; or $R_8$ and $R_9$ substituents taken together forming a substituted or unsubstituted alkylene, alkenylene or alkynylene chain completing a 3, 4, 5, 6, 7, 8, 9 or 10 membered aromatic, heteroaromatic, heteroalicyclic or alicyclic ring, which ring may include one or more heteroatoms and/or divalent moieties such as nitrogen, sulfur, sulfinyl, sulfonyl, phosphorus, selenium, ester, carbonyl, and oxygen, wherein permissible substituents are the aforementioned acid and other functional groups; and M is selected from a group consisting of a non-metal cation such as $Bu_4N^+$, $H^+$, $NO^+$, $NO_2^+$, $NH_4^+$, $^+N(CH_3)_2H_2$, $^+N(C_2H_5)H_3$, and the like, or a metal cation such as $Na^+$, $Li^+$, $K^+$, $Mg^{2+}$, $Ca^{2+}$, $Ag^+$, $Ba^{+2}$, $Co^{+3}$, $Al^{+3}$, $Fe^{+3}$ and the like.

Illustrative Examples of the Polyanilines

Polyanilines are homopolymers or copolymers in which at least 50 mol % of the recurring backbone monomeric units in vary ratio are selected from the group consisting of substituted or unsubstituted phenyl rings and amine linkages (—NH— or —NR— where R is a substituent other than hydrogen), substituted or unsubstituted quinoid rings and imine (—N=) linkages. Neutral or undoped polyaniline is characterized by an uncharged polyaniline backbone. Electrically conductive or doped polyaniline is characterized by a charged backbone which may be formed by a partial or complete protonation of the amine and/or imine nitrogen atoms.

Any form of such polyanilines can be conveniently used in the practice of the present invention. Illustrative of useful forms are those described in Green, A. G. and Woodhead, A. E., CXVII-Aniline-black and Allied Compounds, Part II", J. Chem. Soc. 101, pp. 1117 (1912) and in Kobayashi, et al., "Electrochemical Reactions . . . of Polyaniline Film-Coated Electrodes", J. Electroanal. Chem., 177. pp. 281-91 (1984).

According to preferred embodiments of the present invention, useful polyanilines are homopolymers and copolymers of the type derived from the polymerization of unsubstituted and substituted anilines of the Formula XI in FIG. 3, wherein:

n is an integer from 0 to 5;

m is an integer from 0 to 5, with the proviso that the sum of n and m is equal to 5 and with the further proviso that at least one position on the aniline ring, preferably at the para position, is substituted with a substituent which will allow coupling of the aniline units, such as halogen, hydrogen or other leaving group;

$R_{12}$ is the same or different at each occurrence and is selected from the group consisting of deuterium, alkyl, alkenyl, alkynyl, alkenynyl, aryl, alkylaryl, arylalkyl, allyl, benzyl, alkoxy, aryloxy, cycloalkyl, cycloalkenyl, cycloalkynyl, cycloalkenynyl, alkanoyl, aryloyl, aryloyloxy, alkanoyloxy, alkylthio, arylthio, alkylthioalkyl, alkylthioaryl, arylthioaryl, mercaptoalkoxy, mercaptoaryloxy, mercaptoalkyl, mercaptoaryl, mercaptoarylthio, mercaptoalkylthio, mercaptoalkylarylalkyl, mercaptoarylalkylaryl, halo, hydroxyl, hydroxyalkyl, hydroxyaryl, cyano, nitro, alkylsilyl, arylsilyl, alkoxysilyl, aroxysilyl, amino acid, epoxy moieties, amino, aminoalkyl, aminoaryl, amido, amidoalkyl, amidoaryl, arylamino, diarylamino, alkylamino, dialkylamino, alkylarylamino, alkoxyalkyl, aryloxyalkyl, alkoxycarbonyl, alkoxysilylalkyl, alkylsilylalkyl, alkoxysilylaryl, alkylsilylaryl, heterocyclic ring, aliphatic ring, aromatic ring, heteroaromatic ring, alkylsulfinyl, arylsulfinyl, alkylsulfonyl, arylsulfonyl, alkylsulfinylalkyl, alkylsulfonylalkyl, alkylcarboxylate, alkylsulfmate, alkylsulfonate, alkylphosphonate, and the ester derivatives of acid functional groups; wherein said acid functional groups are selected from the group consisting of phosphonic acid, phosphinic acid, boric acid, carboxylic acid, sulfinic acid, sulfonic acid, sulfamic acid, and amino acid; said aromatic ring, said heteroaromatic ring, said aliphatic ring, and said heterocyclic ring can be unsubstituted or substituted with one or more functional groups selected from the group consisting of phosphonic acid, phosphinic acid, boric acid, carboxylic acid, sulfinic acid, sulfonic acid, sulfamic acid, amino acid, derivatives of the aforementioned acids such as their esters and salts, alicyclic ring, heteroalicyclic ring, aromatic ring, heteroaromatic ring, halo, nitro, cyano, mercapto, hydroxyl, epoxy moieties, and other aforementioned $R_{12}$ functional groups; any two $R_{12}$ groups together, or any $R_{12}$ and $R_{13}$ groups together forming a substituted or unsubstituted alkylene, alkenylene or alkynylene chain completing a 3, 4, 5, 6, 7, 8, 9 or 10 membered aromatic, heteroaromatic, heteroalicyclic or alicyclic ring, which ring may include one or more heteroatoms and/or divalent moieties such as nitrogen, sulfur, sulfinyl, sulfonyl, phosphorus, selenium, ester, carbonyl, and oxygen, wherein permissible substituents are the aforementioned acid and other functional groups; or $R_{12}$ is an aliphatic moiety having repeat units of the formula:

$$-(OCH_2CH_2)_qOCH_3, -(OCH_2CH(CH_3))_qOCH_3,$$

$$-(CH_2)_qCF_3, -(CF_2)_qCF_3, \text{ or } -(CH_2)_qCH_3$$

wherein q is a positive whole number; or, $R_{12}$ is derivatives of a moiety of the formula:

$$-(OR_{10})_rOR_{11}$$

wherein:

$R_{10}$ is a divalent alkylene moiety having from 1 to about 7 carbon atoms;

$R_{11}$ is alkyl having from 1 to about 20 carbon atoms;

r is a natural number from 1 to about 50;

$R_{13}$ is the same or different at each occurrence and is selected from a group consisting of permissible $R_{12}$ substituent or hydrogen.

Figure 4:
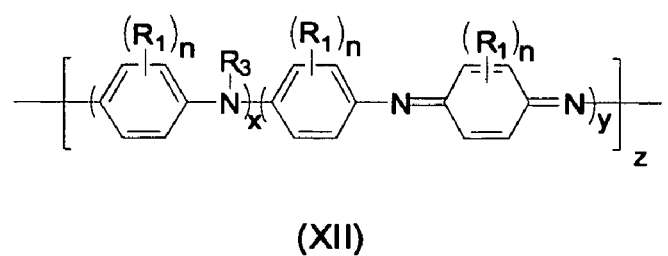
FIG. 4 is a diagram illustrating the polyanilines in Formula (XII) used in implementing a preferred embodiment of the method according to the present invention.

Illustrative of the preferred polyanilines useful in the practice of the present invention are those of the Formulas XII of FIG. 4, wherein:

n is the same or different at each occurrence and is an integer from 0 to about 4;

$R_1$ and $R_3$ are as described above;

x and y are the same or different at each occurrence and are integers equal to or greater than 0, with the proviso that the sum of x and y is greater than 0; and z is the same or different at each occurrence and is an integer greater than 0.

In general, the number of repeat units in polyaniline homopolymers or copolymers is not critical and may vary widely. The greater the number of repeat units the greater the viscosity and molecular weight of the polyaniline homopolymer or copolymer. In those applications where a polyaniline homopolymer or copolymer of relatively low molecular weight and viscosity is required, such materials may be used, and in those applications where a polyaniline homopolymer or copolymer of relatively high molecular weight and viscosity is required, then such materials can be used. The number of repeat units is at least about 3. The upper limit can vary widely depending on the desired molecular weight and viscosity and the required degree of processibility, such as melt processibility, solution processibility and the like. In the preferred embodiments of the invention, the number of repeat units is at least about 10, and in the particularly preferred embodiments, the number of repeat units is at least about 30. Amongst the particularly preferred embodiments, most preferred are those embodiments in which the number of repeat units is at least about 40.

Polyaniline homopolymers and copolymers can be conveniently prepared through conventional procedures. Such procedures are well known in the art and will not be described herein in great detail. See, for example, E. M. Genies, A. Boyle, M. Lapkowski and C. Tsintavis, Synthetic Metals, 1990, 36, 139. The polyanilines can be prepared through use of any chemical or electrochemical synthetic procedures known in the art. For example, one form of polyaniline can be prepared by treating aniline with ammonium persulfate $(NH_4)_2S_2O_8$ in excess 1M HCl. This powdered form of polyaniline is blue green in color. After methanol washing and air drying this material exhibits a conductivity of about 5 S/cm. This conductive form of polyaniline can be treated with ammonium hydroxide in ethanol to form a non-conductive form of polyaniline which is purple in color and has a conductivity of less than $10^{-10}$ S/cm. Other chemical procedures for preparation of various chemical forms of polyaniline are described in detail in Green et al, cited herein.

Useful forms of polyaniline can also be prepared electrochemically. For example, useful forms of polyaniline can be prepared by an electrochemical oxidation of aniline in aqueous fluoroboric acid electrolyte on a platinum foil anode.

Other chemical and electrochemical syntheses and transformations of polyaniline may be discovered and are presently contemplated as being useful. Moreover, additional forms or types of polyaniline may be elucidated in the future. Accordingly, no limitation to the syntheses, transformation, or structures herein described or postulated is intended beyond the limitations or equivalents of the appended claims.

All the above-synthesized polyanilines can be used to synthesize the thermally stable self-doped functionalized polyanilines of this invention via the method of this invention as described in above by reacting polyanilines with the reactive chemical reagents of this invention, providing that the above obtained polyanilines have an oxidation state other than their fully reduced leucoemeraldine forms. Regarding to those polyanilines being obtained in their leucoemeraldine forms, they can also be used for making the thermally stable self-doped functionalized polyanilines of this invention, as long as an additional oxidation treatment is employed simultaneously or separately or sequentially to provide the oxidized units, i.e. the diiminoquinoid rings.

Figure 5:
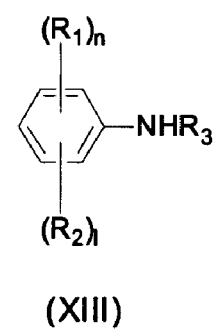
FIG. 5 is a diagram illustrating the useful aniline monomers in Formula (XIII) for making the thermally stable self-doped functionalized polyanilines by an alternative embodiment of the present invention.

Alternatively, homopolymers of the thermally stable self-doped functionalized polyanilines of this invention can also be prepared, via any chemical or electrochemical methods known in the art, directly from an aniline monomer containing at least one $R_2$ substituent, as that being illustrated by the Formula XIII in FIG. 5. Copolymers of the thermally stable self-doped functionalized polyanilines of this invention can also be similarly prepared using a monomer mixture containing the aniline monomers of both Formula (XIII) in FIG. 5 and Formula (XI) in FIG. 3. Since the thermally stable self-doped functionalized polyanilines prepared directly from a polyaniline by the method of this invention were found to be, in general, much more conductive than their counterparts prepared via other synthetic methods known in the art, the method of this invention is the preferable choice when a property of high conductivity is also required by the corresponding applications. In those applications when a property of high conductivity is not critically required, then, under such circumstances, the conventional chemical and electrochemical methods can also be employed for making the thermally stable self-doped functionalized polyanilines of this invention.

The homopolymers or copolymers of the thermally stable self-doped functionalized polyanilines of this invention can be either in the neutral undoped (nonconductive) form(s) or in the conductive, doped forms with various doping degrees.

In the case of their neutral undoped (nonconductive) form(s), the covalently bonded acid functional groups of the self-doped functionalized polyanilines are in the salt or ester forms. In the case of their conductive and doped forms, the covalently bonded acid functional group of the self-doped functionalized polyanilines are in their acid forms. The degree of doping can be varied by controlling the amount of the $R_2$ group and by the extent of the acid forms of the covalently bonded acid functional groups.

The amount of the covalently bonded acid functional group and the degree of doping is not critical and may vary widely, depending on the requirement of the applications. In general, the larger amount of the $R_2$ group and the higher extent of the acid forms of the covalently bonded acid functional groups, the higher the conductivity of the self-doped functionalized polyanilines will be. Usually, a sufficient amount of acid functional groups is attached to the polyaniline backbone to at least form doped polymer that is a semi-conductor, which has a conductivity of at least about $10^{-12}$ S/cm. The upper level of conductivity is not critical and depends on the type of homopolymer or copolymer employed. In general, for those applications utilizing the conductivity property, the highest level of conductivity obtained is provided without unduly adversely affecting the environmental stability of the polyaniline homopolymer or copolymer. In the various embodiments of the present invention, the amount of the attached acid functional groups is sufficient to provide a conductivity of at least about $10^{-9}$ S/cm. In particularly preferred embodiments according to the present invention, the amount of the attached acid functional groups is sufficient to provide a conductivity of about $10^{-2}$ S/cm to about $10^{+2}$ S/cm.

Depending on the need and purpose of a particular application, external dopants can be optionally added as a supplemental dopant. Useful external dopants can be an oxidizing dopant, such as $AsF_5$, $NO^+$ and $NO_2^+$ salts (such as $NOBF_4$, $NOPF_6$, $NOSbF_6$, $NOAsF_6$, $NO_2BF_4$, $NO_2\,PF_6$, $NO_2AsF_6$, $NO_2SbF_6$, and the like), $HClO_4$, $HNO_3$, $H_2SO_4$, $SO_3$, $I_2$, and Fe (III) salts (such as $FeCl_3$, $Fe(OTs)_3$, $Fe(CF_3SO_3)_3$, and the like). Useful external dopants can also be a protonic acid dopant. Such dopants include inorganic acids, such as hydrofluoric acid, hydroiodic acid, phosphoric acid, nitric acid, boric acid, sulfuric acid and the like; other protonic acid dopants are organic acids, such as aryl or alkyl compounds containing sulfonic acid, sulfinic acid, sulfamic caid, amino acid, carboxylic acid, phosphonic acid, phosphinic acid, or boric acid moieties.

The thermally stable self-doped functionalized polyanilines prepared according to the present invention can be used for any purpose for which conducting polymers are useful. For example, the self-doped functionalized polyanilines can be mixed with one or more conventional polymers to form conductive blends, which can be used in the fabrication of articles that comprise electrically conductive portions and electrically non-conductive portions, and articles that are completely electrically conductive. Examples of such articles include electrically conductive polymer housings for EMI shielding of sensitive electronic equipment such as microprocessors; infrared, radio frequency and microwave absorbing shields; flexible electrical conducting connectors; conductive bearings and brushes; semiconducting photoconductor junctions; electrodes; capacitors; optically transparent or non-transparent corrosion-preventing coatings for corrodible materials such as steel; antistatic materials and optically transparent or non-transparent conductive coatings for packaging electronic components; conductive carpet fibers; conductive waxes for floors in computer rooms; antistatic finishes for CRT screens, aircraft and auto windows, and the like.

Various other potential applications involve the conductive coatings produced from the thermally stable self-doped functionalized polyanilines of the present invention include applications such as capacitor; solar cells; fuel cells; conductive plastic gas tanks; solar window coatings; transparent electrical elements for heated windows and heated liquid crystal displays; electrochromic displays; electrical contacts and/or hole transport layer material for electroluminescent displays and elecroluminescent lights; and electrical contacts for piezoelectric films for transparent loud speakers; transparent conducting coatings for windows in burglar alarm systems; membrane coatings for chemical separations (such as $O_2$ and $N_2$, for example); conducting coatings for membrane switches; and a discharge layer or photoresist layer for lithographic process. The following specific examples are presented to more particularly illustrate the present invention, and should not be construed as being limitations on the scope and spirit of the present invention.

EXAMPLE I

Polyaniline powder is prepared by a chemical means by the following procedure. Aniline (50 g, 0.54 mole) and 204.4 g of p-toluenesulfonic acid monohydrate (1.08 mole, Aldrich Chemical) are dissolved in 1750 mL of $H_2O$ in a three neck round bottom flask equipped with a mechanical stirrer and an addition funnel. After the reaction mixture is cooled to 15° C., an aqueous solution of ammonium peroxysulfate (157 g in 270 mL $H_2O$) is added dropwise through the addition funnel. The overall addition time was 2 h and 50 min. After the addition is finished, the reaction mixture is stirred for another 30 min.

The resultant solid is collected by filtration. The filtration cake is then dispersed and stirred for 30 min in 1.5 L of a 12 wt % aqueous solution of p-toluenesulfonic acid for four times. Each time, the solid is re-collected and then re-dispersed into a fresh p-toluenesulfonic acid solution.

After the above treatment, the filter cake is then dispersed and stirred for 30 min in 1.5 L of 8 wt % methanol solution of p-toluenesulfonic acid for two times. Each time, a fresh p-toluenesulfonic acid is used. The final filter cake is dried at 25° C. in air for 15 h and then at 80° C. under dynamic vacuum for 3 h.

Yield for the above toluenesulfonic acid doped polyaniline was 83 g, and elemental analysis (wt %) is C(63.17), H(4.99), N(8.30), S(8.88), O(13.87).

EXAMPLE II

The undoped neutral polyaniline powder is prepared from the above p-toluenesulfonic acid doped polyaniline (i.e., poly(anilinium tosylate)) by dedoping with a base as described in the following. Poly(anilinium tosylate) (50 g) obtained in Example I is suspended in 500 mL $H_2O$ and stirred with 30 g of sodium carbonate at ambient temperature for 20 h. The resulting solid is collected by filtration and rinsed with 2 L of deionized water. The filter cake is dispersed in 1.5 L of deionized water and stirred for 4 h to remove sodium carbonate residue. The solid is then re-collected by filtration and rinsed with 2 L of deionized water. The resulting filter cake is air-dried at 25° C. for 20 h and then vacuum-dried at 80° C. for 3 h.

The elemental analysis results showed that the sample is free of dopant (S<0.03 wt %) and sodium carbonate (Na, non-detectable).

EXAMPLE III

A freestanding film of about 10 µm (±2 µm) thick can be prepared from a NMP (N-methylpyrrolidinone) solution of the neutral polyaniline powder as prepared in Example II by the following procedure. A 0.48 wt % blue solution of polyaniline is prepared by dissolving the above dedoped polyaniline powder about 0.1 g in 25 mL NMP. After filtered off some small amount of insoluble solid, the resulting solution is cast into freestanding films on cleaned glass slides (7.5×2.5 cm in size), by carefully placing about 1.5-2.0 mL solution on each slide and pumping to dryness in a vacuum oven for about 24 h. A blue film with metallic shining is then formed, which can be peeled off by immersing the coated glass slide in methanol for 2-3 h.

EXAMPLE IV

A polyaniline coating of about 0.5 µm thick can be similarly prepared from the same polyaniline solution in Example III by casting a much smaller amount of solution on a conductive ITO (Indium Tin Oxide) glass or a plate of stainless steel.

EXAMPLE V

A polyaniline film (or coating) can be grown on a platinum electrode via an electrochemical means using a 0.1 M aniline solution by the following procedure.

The growth of polyaniline thin films are conducted in a three-electrode electrochemical cell, using platinum plates or wires as both the working and counter electrodes and a saturated calomel electrode (SCE) as the reference electrode. All the polymerization reactions are controlled by a potentiostat (EG&G 273) under a constant current density of $13.3 \times 10^{-6}$ A/cm$^2$ for 25 minutes, in a 0.5 M $H_2SO_4$ aqueous solution that contains 0.1 M aniline. The thickness of the polyaniline film thus obtained (of about 80-100 nm) is measured by SIMS (secondary ion mass spectroscopy) depth-profiling and an α-step.

EXAMPLE VI

A free-standing polyaniline film of about 10 µm thick prepared in Example III is soaked with a 0.1 M methanolic solution of mercaptopropanesulfonic acid sodium salt (MPS-Na) for 6 h. A catalytic amount of protonic acid, e.g., 0.01 M acetic acid, is added to promote the reaction rates. The resulted polyaniline film is thoroughly rinsed and soaked with methanol (to remove any MPS-Na residue), followed by soaking in 5% aqueous $Na_2CO_3$ (to remove the acetic acid catalyst and/or any non-bonded 3-mercapto-1-propanesulfonic acid residue), deionized $H_2O$ (to remove $Na_2CO_3$), and acetone (to remove $H_2O$), before being blown dried with nitrogen gas to remove the cleaning solvents. After the treatment with MPS-Na, the polyaniline backbone is found to be highly reduced and substituted with alkylthio groups that contain a sulfonic acid moiety. Similar reaction pattern has also been observed when polyaniline is treated with other thiols. The reduction and substitution phenomena in the MPS-Na treated films are confirmed by attenuated total reflectance infrared (ATRIR) spectroscopy. The ATRIR spectrum of the resulting polyaniline film show reduction in the intensities of the peaks associated with diiminoquinoid rings at 1600 cm$^{-1}$ (C=C stretching vibration of diiminoquinoid rings), 1169 cm$^{-1}$ (a vibration mode associated with the diiminoquinoid ring) and 820 cm$^{-1}$ (C—H out-of-plane vibration of 1,4-ring). Similar intensity reduction of these three peaks has also been observed when polyaniline emeraldine base is reduced by hydrazine to leucoemeraldine base. The same ATRIR spectrum of the MPS-Na treated film also show the presence of a new peak at 1041 cm$^{-1}$, attributable to the symmetric $SO_3$ stretching of the newly introduced 3-mercapto-1-propanesulfonic acid substituent (MPS-substituent). Also shown in the same IR spectrum are three small new peaks at about 2971, 2934 and 2876 cm$^{-1}$, which can be attributed to the asymmetric (2971, 2934 cm$^{-1}$) and symmetric (2876 cm$^{-1}$) —CH$_2$— stretching of the newly introduced MPS-substituent. Similar weak C—H stretching peaks for MPS-Na are observed at 2974, 2939 and 2860 cm$^{-1}$, with intensities less than one-tenth of that for its SO$_3$ asymmetric stretching peak at 1194 cm$^{-1}$.

The presence of the new sulfonic-acid-containing alkylthio substituent in the resulting polyaniline film is also shown by x-ray photoelectron spectroscopy (XPS). In addition to the original C 1s (with a binding energy of 284.6 eV) and N 1s (399.2 eV) lines, the XPS survey spectrum of the MPS-Na treated film show the newly appeared O 1s line at 531.5 eV and the S 2p lines at around 160-170 eV. The more detailed S 2p chemical state spectrum for the same film indicate that there are two new S $2p_{3/2}$ lines at 163.5 eV and 167.6 eV, attributable to the sulfide linkage (but not disulfide or thiol) and the sulfonic acid end group, respectively.

The resulted propylthiosulfonated polyaniline (MPS-Pan) film is found to have a self-doping conductivity of 0.2 S/cm, in the absence of any external dopant. This self-doping conductivity is also found to be relatively insensitive to pH change in the range of 1-7, as expected for a typical self-doped polyaniline. Compared to the self-doping conductivity of ca. 10$^{-5}$ S/cm for a previously reported sulfonated-polyaniline (at a slightly higher self-doping degree, i.e. 26 mol %), the unusually high conductivity of this new self-doped polyanilines (with a self-doping degree of only ca. 20 mol %) is especially worth noting.

The distribution of the mercaptopropanesulfonic acid substituent (i.e., propylthio sulfonate) within a polyaniline film is investigated by SIMS (secondary ion mass spectroscopy) utilizing a depth profiling study. The results clearly show that the S atom (with propylthio sulfonate substituent group being the only sulfur source) is distributed evenly throughout the thickness of this control polyaniline specimen. The substitution reaction is effectively performed within the solid state polyaniline matrix (about 10 μm thick), and thus the reaction is not limited to the surface of the film.

EXAMPLE VII

The thermal stabilities of this new type of self-doping MPS-Pans, prepared in Example VI, were examined by thermogravimetric analysis (TG). The TG result for a 20 mol % substituted MPS-Pan showed, in addition to the small water-losing event at below ca. 120° C., a minor weight loss event (due to the loss of the sulfonic acid group as confirmed by the XPS study) between 260 and 400° C. followed by a major weight loss event at 524° C. (due to the decomposition of the polymer backbone). The minor weight loss event has an initialization temperature at ca. 260° C. and an onset temperature of ca. 270° C. The major weight loss event has an onset temperature at ca. 470° C. with the initialization temperature being obscured by the proceeding minor event. For comparison, a 55.8 mol % sulfonated-polyaniline (S-Pan), prepared according to the previously reported method (Yue, J.; Wang, Z. H.; Cromack, K. R.; Epstein, A. J.; MacDiarmid, A. G. *J. Am. Chem. Soc.* 1991, 113, 2665) was also examined under the same TG conditions. The result indicated that, in addition to the initial water loss event at below ca. 120° C., the weight loss of the S-Pan showed a continuous multistage feature, with an initialization temperature at ca. 185° C. (due to the loss of the sulfonic acid group), an onset at ca. 230° C., and a first major decomposition at ca. 273° C. Similar initialization and major decomposition temperature at 190 and 275° C., respectively, for a 50 mol % S-Pan has been previously reported by Chen (Chen, S. A.; Hwang, G W. *Macromolecules* 1996, 29, 3950).

Attempts were made, using XPS studies, to elucidate the cause of the observed TG weight loss and gain insights on the thermal degradation chemistry of different samples. A series of the above samples of MPS-Pan and S-Pan were heated at a predetermined temperature (e.g., 30, 100, 210, 240, 270, 340, and 420° C.) under N$_2$ atmosphere for 1 h and their S/N atomic ratio examined by XPS. The results on MPS-Pan samples showed that, within experimental error, the S/N ratios were almost unchanged at 0.392+0.02, after they were heat treated at below 240° C.; whereas the S/N ratio of S-Pan treated under similar temperature decreased significantly from 0.558 (heated at 30° C.), through 0.382 (at 210° C.), then to 0.224 (at 240° C.). These results indicated that the structure of MPS-Pan was intact up to at least 240° C. Whereas significant amount of the sulfonic acid group on S-Pan was cleaved at 210° C. Results from Table 1 showed that further increase in treatment temperature led to steady decrease in S/N atomic ratio, suggesting a continue loss of sulfur-containing moieties from the polyanilines. Further detailed XPS chemical state studies indicated that the reduction in S/N ratio of the MPS-Pan initiated at 260° C. was mainly caused by the loss of the terminal SO$_3^-$ group, while the sulfide linkage remained intact until ca. 300° C. Therefore, from the TG and heat treatment studies, one can suggest that, the thermal degradation of S-Pan involved the loss of sulfonic acid group (initiated at 185° C.) probably followed by backbone decomposition. Whereas MPS-Pan degradation also involved the loss of sulfonic acid group but initiated at a much higher temperature of 260° C.

These results clearly indicated that the new type of self-doped polyaniline MPS-Pan of this invention indeed showed a much higher thermal stability than that of the best example of self-doped polyaniline, i.e. the sulfonated-polyaniline S-Pan, previously known in the art.

TABLE 1

S/N atomic ratios of MPS-Pan and S-Pan after heated at different temperatures

| Temperature[a] (° C.) | MPS-Pan (S/N)[b] | S-Pan (S/N)[b] |
|---|---|---|
| 30 | 0.395 | 0.558 |
| 100 | 0.393 | 0.540 |
| 210 | 0.388 | 0.382 |
| 240 | 0.391 | 0.224 |
| 270 | 0.298 | 0.182 |
| 340 | 0.153 | 0.089 |
| 420 | 0.136 | 0.038 |

[a]The samples were heated at the given temperature for 1 h under 1 atm of N$_2$.
[b]The S/N atomic ratio as measured by XPS.

While the present invention has been particularly shown and described with reference to the preferred embodiments thereof, the embodiments are not intended to be exhaustive or to limit the present invention to the precise forms disclosed herein. It will be understood by those skilled in the art that various changes in form and detail may be made therein without departing from the spirit and scope of the invention. Similarly, any process steps described may be interchangeable with other steps in order to achieve substantially the same result. The scope of the present invention is defined by the following claims and their equivalents.

We claim:

1. A thermally stable self-doped functionalized polyaniline comprising the repeat units of Formulas I,

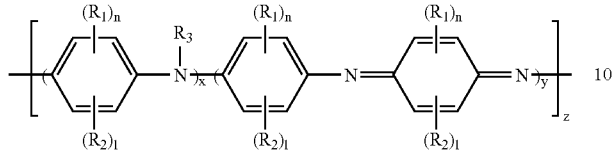

wherein:
x and y are the same or different at each occurrence and are integers equal to or greater than 0, with the proviso that the sum of x and y is greater than 0;
z is the same or different at each occurrence and is an integer greater than 0;
n is the same or different at each occurrence and is an integer from 0 to about 4;
l is the same or different at each occurrence and is an integer from 0 to 4, with the proviso that at least one occurring l is not zero and with the further proviso that the sum of n and l at the same occurring repeat unit is equal to or less than 4;
$R_1$ and $R_3$ are the same or different at each occurrence and are a hydrogen or a substituent; and
$R_2$ is the same or different at each occurrence and has the formula of:

—X—$R_4$ wherein X is the same or different at each occurrence and is a divalent atom or moiety;
$R_4$ is the same or different at each occurrence and is an acid-substituted functional group.

2. The thermally stable self-doped functionalized polyaniline according to claim 1, wherein:
$R_1$ and $R_3$ are the same or different at each occurrence and are selected from the group consisting of hydrogen, deuterium, alkyl, alkenyl, alkynyl, alkenynyl, aryl, alkylaryl, arylalkyl, allyl, benzyl, alkoxy, aryloxy, cycloalkyl, cycloalkenyl, cycloalkynyl, cycloalkenynyl, alkanoyl, aryloyl, aryloyloxy, alkanoyloxy, alkylthio, arylthio, alkylthioalkyl, alkylthioaryl, arylthioaryl, mercaptoalkoxy, mercaptoaryloxy, mercaptoalkyl, mercaptoaryl, mercaptoarylthio, mercaptoalkylthio, mercaptoalkylarylalkyl, mercaptoarylalkylaryl, halo, hydroxyl, hydroxyalkyl, hydroxyaryl, cyano, nitro, alkylsilyl, arylsilyl, alkoxysilyl, aroxysilyl, amino acid, epoxy moieties, amino, aminoalkyl, aminoaryl, amido, amidoalkyl, amidoaryl, arylamino, diarylamino, alkylamino, dialkylamino, alkylarylamino, alkoxyalkyl, aryloxyalkyl, alkoxycarbonyl, alkoxysilylalkyl, alkylsilylalkyl, alkoxysilylaryl, alkylsilylaryl, heterocyclic ring, aliphatic ring, aromatic ring, heteroaromatic ring, alkylsulfinyl, arylsulfinyl, alkylsulfonyl, arylsulfonyl, alkylsulfinylalkyl, alkylsulfonylalkyl, alkylcarboxylate, alkylsulfmate, alkylsulfonate, alkylphosphonate, and the ester derivatives of acid functional groups; wherein said acid functional groups are selected from the group consisting of phosphonic acid, phosphinic acid, boric acid, carboxylic acid, sulfinic acid, sulfonic acid, sulfamic acid, and amino acid; said aromatic ring, said heteroaromatic ring, said aliphatic ring, and said heterocyclic ring can be unsubstituted or substituted with one or more functional groups selected from the group consisting of phosphonic acid, phosphinic acid, boric acid, carboxylic acid, sulfinic acid, sulfonic acid, sulfamic acid, amino acid, derivatives of the aforementioned acids such as their esters and salts, alicyclic ring, heteroalicyclic ring, aromatic ring, heteroaromatic ring, halo, nitro, cyano, mercapto, hydroxyl, epoxy moieties, and other aforementioned $R_1$ and $R_3$ groups; any two $R_1$ groups together and any $R_1$ and $R_3$ groups together forming a substituted or unsubstituted alkylene, alkenylene, or alkynylene chain completing a 3, 4, 5, 6, 7, 8, 9 or 10 membered aromatic, heteroaromatic, heteroalicyclic, or alicyclic ring, which ring may include one or more heteroatoms and/or divalent moieties such as nitrogen, sulfur, sulfinyl, sulfonyl, phosphorus, selenium, ester, carbonyl, and oxygen, wherein permissible substituents are the aforementioned acid and other functional groups;
$R_2$ is the same or different at each occurrence and has the formula of:

—X—$R_4$ wherein X is the same or different at each occurrence and is selected from the group consisting of S, O, $PR_5$, $NR_5C(=O)$, and $NR_5$,
wherein $R_5$ is the same or different at each occurrence and is selected from the group consisting of hydrogen and other permissible $R_1$ group; and
$R_4$ is the same or different at each occurrence and is an acid-substituted functional group, wherein said functional group is selected from the group consisting of alkyl, aryl, alkenyl, alkynyl, alkenynyl, allyl, benzyl, cycloalkyl, cycloalkenyl, cycloalkynyl, cycloalkenynyl, alkanoyl, aryloyl, mercaptoalkyl, mercaptoaryl, mercaptoalkylarylalkyl, mercaptoarylalkylaryl, hydroxyalkyl, hydroxyaryl, alkylsilyl, arylsilyl, alkoxysilyl, aroxysilyl, amino acid, epoxy moieties, alkoxyalkyl, aryloxyalkyl, alkoxycarbonyl, alkoxysilylalkyl, alkylsilylalkyl, alkoxysilylaryl, alkylsilylaryl, heteroaryl, alkylaryl, alkylheteroaryl, arylalkyl, heteroarylalkyl, alkylarylalkyl, alkylheteroarylalkyl, alicyclic, and heterocyclic groups; and said acid substituent is selected from the group consisting of phosphonic acid, phosphinic acid, boric acid, carboxylic acid, sulfinic acid, sulfonic acid, sulfamic acid, amino acid, and the derivatives thereof such as esters and salts and the like.

3. The thermally stable self-doped functionalized polyaniline according to claim 2, wherein:
X is $NR_5C(=O)$.

4. The thermally stable self-doped functionalized polyaniline according to claim 2, wherein:
X is S.

5. The thermally stable self-doped functionalized polyaniline according to claim 2, wherein:
$R_1$ is an aliphatic moiety having repeat units of the formula:

—(OCH$_2$CH$_2$)$_q$OCH$_3$, —(OCH$_2$CH(CH$_3$))$_q$OCH$_3$,

—(CH$_2$)$_q$CF$_3$, —(CF$_2$)$_q$CF$_3$, or —(CH$_2$)$_q$CH$_3$ wherein q is a positive whole number.

6. The thermally stable self-doped functionalized polyaniline according to claim 2, wherein:

$R_1$ is derivatives of a moiety of the formula:

—$(OR_{10})_rOR_{11}$ wherein:

$R_{10}$ is a divalent alkylene moiety having from 1 to about 7 carbon atoms;

$R_{11}$ is alkyl having from 1 to about 20 carbon atoms;

r is a natural number from 1 to about 50.

7. The thermally stable self-doped functionalized polyaniline of claim 1 which is prepared using a process comprising the following steps:

(a) providing polyaniline in a solid state form; and (b) subjecting the solid state polyaniline to a reaction treatment with a solution of reactive chemical reagent(s) in a selected solvent or solvent mixture for a period of time, the solvent or solvent mixture is capable of dissolving or dispersing the chemical reagent(s) and swelling or wetting the solid state polyaniline, and the chemical reagent(s) is capable of functionalizing the solid state polyaniline and transforming the backbone of the solid state polyaniline into a more reduced form.

8. The thermally stable self-doped functionalized polyaniline according to claim 7, wherein the reaction treatment step employs at least one reactive chemical reagent.

9. The thermally stable self-doped functionalized polyaniline according to claim 7, wherein the reactive chemical reagent is selected from a group consisting of thiols, alcohols, phosphines, amines, amides, and the combinations thereof.

* * * * *